United States Patent [19]
Lane et al.

[11] Patent Number: 5,621,900
[45] Date of Patent: Apr. 15, 1997

[54] METHOD AND APPARATUS FOR CLAIMING BUS ACCESS FROM A FIRST BUS TO A SECOND BUS PRIOR TO THE SUBTRACTIVE DECODE AGENT CLAIMING THE TRANSACTION WITHOUT DECODING THE TRANSACTION

[75] Inventors: Thomas R. Lane, San Jose; James P. Kardach, Saratoga, both of Calif.

[73] Assignee: Intel Corporation, Santa Clara, Calif.

[21] Appl. No.: 442,690

[22] Filed: May 17, 1995

[51] Int. Cl.$^6$ .......................... G06F 13/36; G06F 13/372
[52] U.S. Cl. ........................ 395/300; 395/281; 395/823
[58] Field of Search ...................... 395/822, 823, 395/856, 281, 287, 308, 306, 728, 731, 732, 730, 299, 500, 293

[56] References Cited

U.S. PATENT DOCUMENTS

| | | | |
|---|---|---|---|
| 5,396,602 | 3/1995 | Amini et al. | 395/293 |
| 5,446,869 | 8/1995 | Padgett et al. | 395/500 |
| 5,450,552 | 9/1995 | Michino | 395/281 |
| 5,467,295 | 11/1995 | Young et al. | 395/200.05 |
| 5,568,619 | 10/1996 | Blackledge et al. | 395/281 |

*Primary Examiner*—Thomas C. Lee
*Assistant Examiner*—D. Dinh
*Attorney, Agent, or Firm*—Blakely, Sokoloff, Taylor & Zafman

[57] ABSTRACT

A computer system has both positive decode agents and subtractive decode agents that are targets of bus transactions, as well as an agent that does not perform a positive decode of a bus transaction, yet does claim bus transactions on behalf of agents to whom a bus transaction is directed.

19 Claims, 5 Drawing Sheets

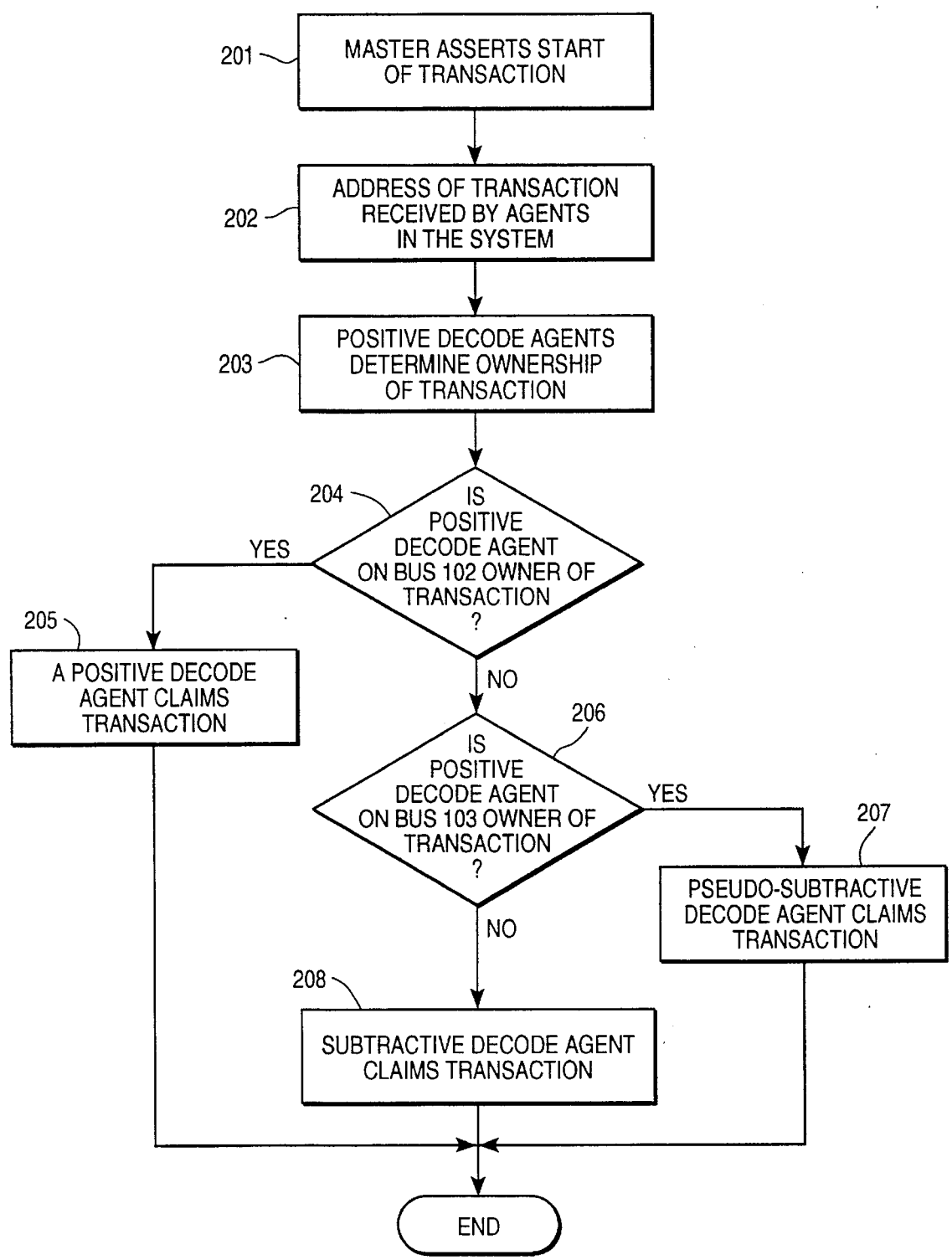
FIG_2

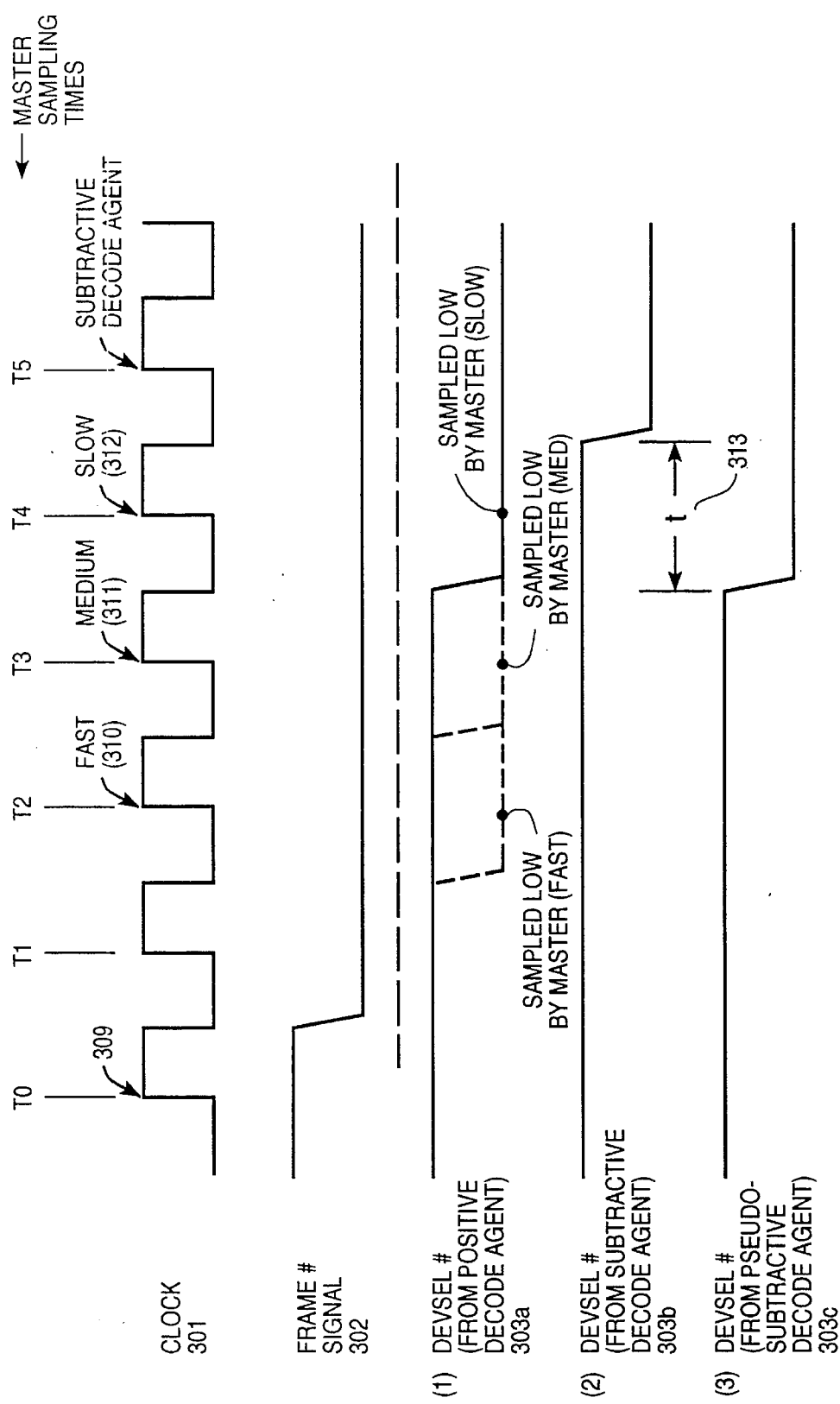
FIG_3

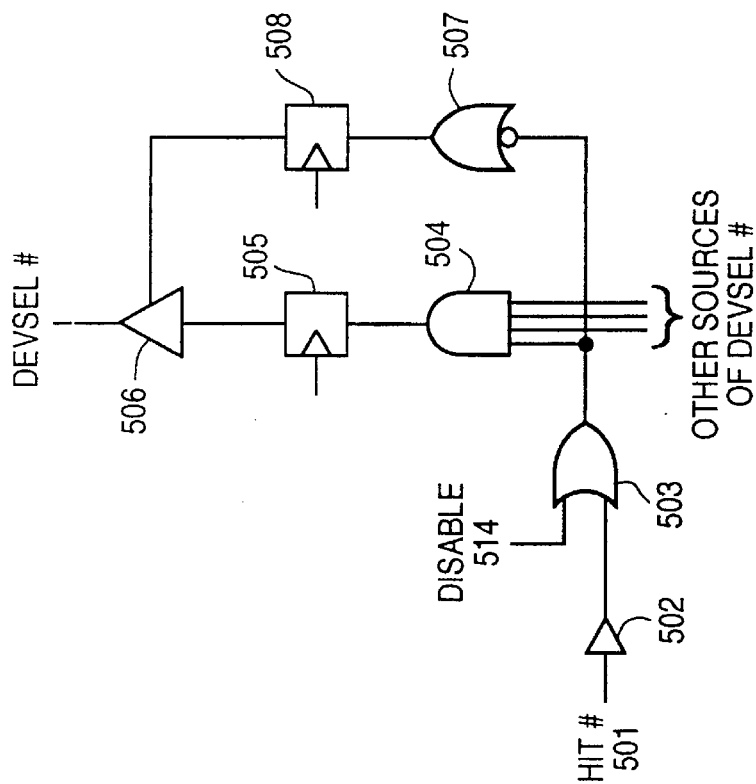
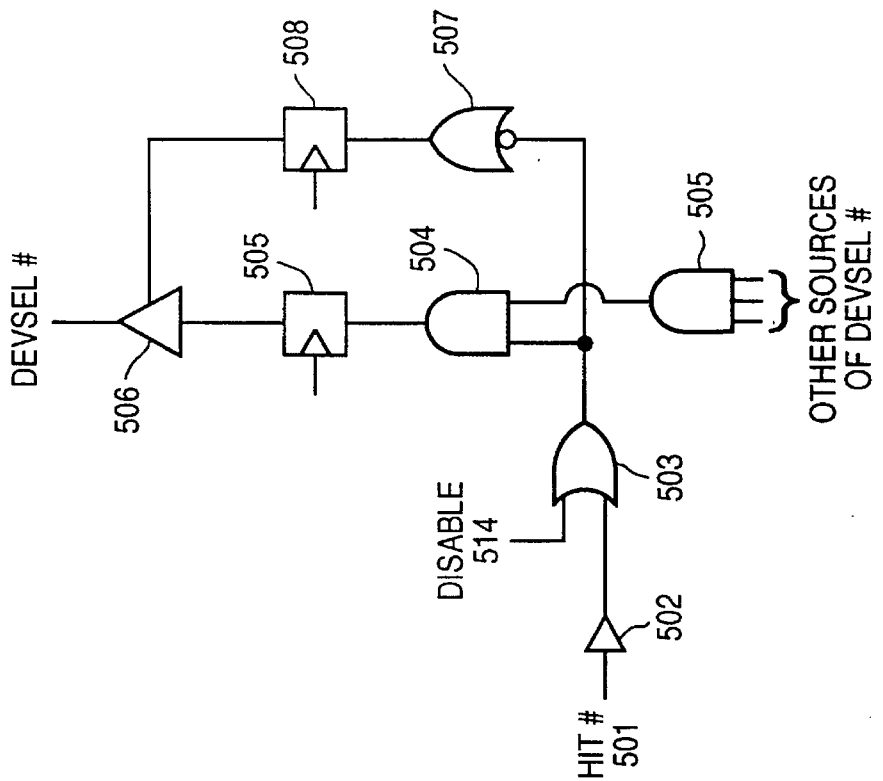

METHOD AND APPARATUS FOR CLAIMING BUS ACCESS FROM A FIRST BUS TO A SECOND BUS PRIOR TO THE SUBTRACTIVE DECODE AGENT CLAIMING THE TRANSACTION WITHOUT DECODING THE TRANSACTION

FIELD OF THE INVENTION

The present invention relates to the field of computer systems; particularly, the present invention relates to performing bus transactions wherein an agent does not determine ownership to claim a bus transaction.

BACKGROUND OF THE INVENTION

A computer system may be divided into three basic blocks: a central processing unit (CPU), memory, and input/output (I/O) units. These blocks are coupled to each other by a bus. An input device, such as a keyboard, mouse, stylus, analog-to-digital converter, etc., is used to input instructions and data into the computer system via an I/O unit. These instructions and data can be stored in memory. The CPU receives the data stored in the memory and processes the data as directed by a set of instructions. The results can be stored back into memory or outputted via an I/O unit to an output device, such as a printer, cathode-ray tube (CRT) display, digital-to-analog converter, etc.

Traditionally, several I/O bus standards have evolved that specify protocols and interfaces for interfacing peripheral devices. These standards include ISA, EISA and other I/O bus standards. Recently, a new I/O bus standard has been introduced for use as a primary I/O bus which provides a much greater bandwidth than previously existing bus standards. The peripheral component interconnect (PCI) bus is quickly receiving wide acceptance in the computer industry. The PCI bus standard provides for high bandwidth and flexibility that is independent of new processor technologies and increased processor speed. At this time, computer system architects are designing peripherals such as graphics, accelerators and SCSI disc drive controllers to be utilized with a PCI bus.

Generally, computer systems designed today that incorporate PCI bus capabilities also include a slower, secondary I/O bus, such as the ones described above, for compatibility with numerous existing, previously designed peripheral devices. However, there are a number of differences between the PCI bus standard and previously I/O bus standards which make difficult interfacing peripheral devices designed for the earlier I/O bus standards to the PCI bus. Even so, many of these peripheral devices are still desired by computer users. Therefore, it is desirable to include or to be able to incorporate these existing peripheral devices that are designed to interface with older bus standards into a system that has a PCI bus.

When performing bus transactions in a typical bus or multi-bus system, a master generates a bus transaction and sends it out on a bus. Agents on the bus perform a decoding operation on the address of the transaction to determine if the bus transaction is targeted to them (i.e., to determine if they are the target agent). If it is determined that a particular agent is the targeted device, then that agent claims the transaction. These types of agents are referred to herein as positive decode agents because they must decode the address of a bus transaction to determine ownership of that particular bus transaction.

The PCI bus standard specification specifies that one agent on the bus may actually claim transactions without determining ownership of the bus. This agent is referred to herein as a subtractive decode agent. After all of the positive decode agents on the bus have decoded the address of a transaction and determined that they do not own the transaction, the subtractive decode agent automatically claims ownership of the transaction.

Subtractive decode agents may be bus bridges that interface the PCI bus to a bus operating according to a standard or set of protocols different than that associated with the PCI bus. Because the PCI bus standard only allows one subtractive decode agent on the bus, a computer system that incorporates a subtractive decode agent as a bus bridge limits the number of non-PCI buses that may be supported. That is, a computer system that incorporates a standard bus, such as a PCI bus, is very limited in the number of buses operating according to different standards and protocols that may be added. It is desirable to be able to have a computer system that incorporates a PCI or other standard bus with more than one bus of a different standard.

The present invention overcomes these limitations of the prior art and provides for allowing multiple non-standard buses to interface with the standard bus in a computer system.

SUMMARY OF THE INVENTION

The present invention provides a method and apparatus for performing bus transactions in a computer system. In one embodiment, the computer system includes a bus, a first agent, a second agent and a third agent. The first agent issues a transaction on the bus. This transaction is claimed within a finite period of time or it is aborted. A second agent coupled to the bus may claim the transaction prior to the expiration of the finite period of time without performing decoding to determine ownership of the transaction if the transaction has not been previously claimed. The third agent may claim the transaction prior to the second agent claiming the transaction without performing decoding on the transaction to determine its ownership.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 2 is one embodiment of the process of performing bus transactions in the computer system of the present invention.

FIG. 3 is a timing diagram depicting the start and completion of bus transactions in the computer system of the present invention.

FIG. 5A is one embodiment of the signal path for the device select signal of the present invention.

FIG. 5B is an alternative embodiment of the signal path for the device select signal of the present invention.

DETAILED DESCRIPTION OF THE INVENTION

A method and apparatus for performing bus transactions in computer systems is described. In the following detailed description of the present invention numerous specific details are set forth, such as specific bus standards, signal names, etc., in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

The Computer System of the Present Invention

Figure 1:
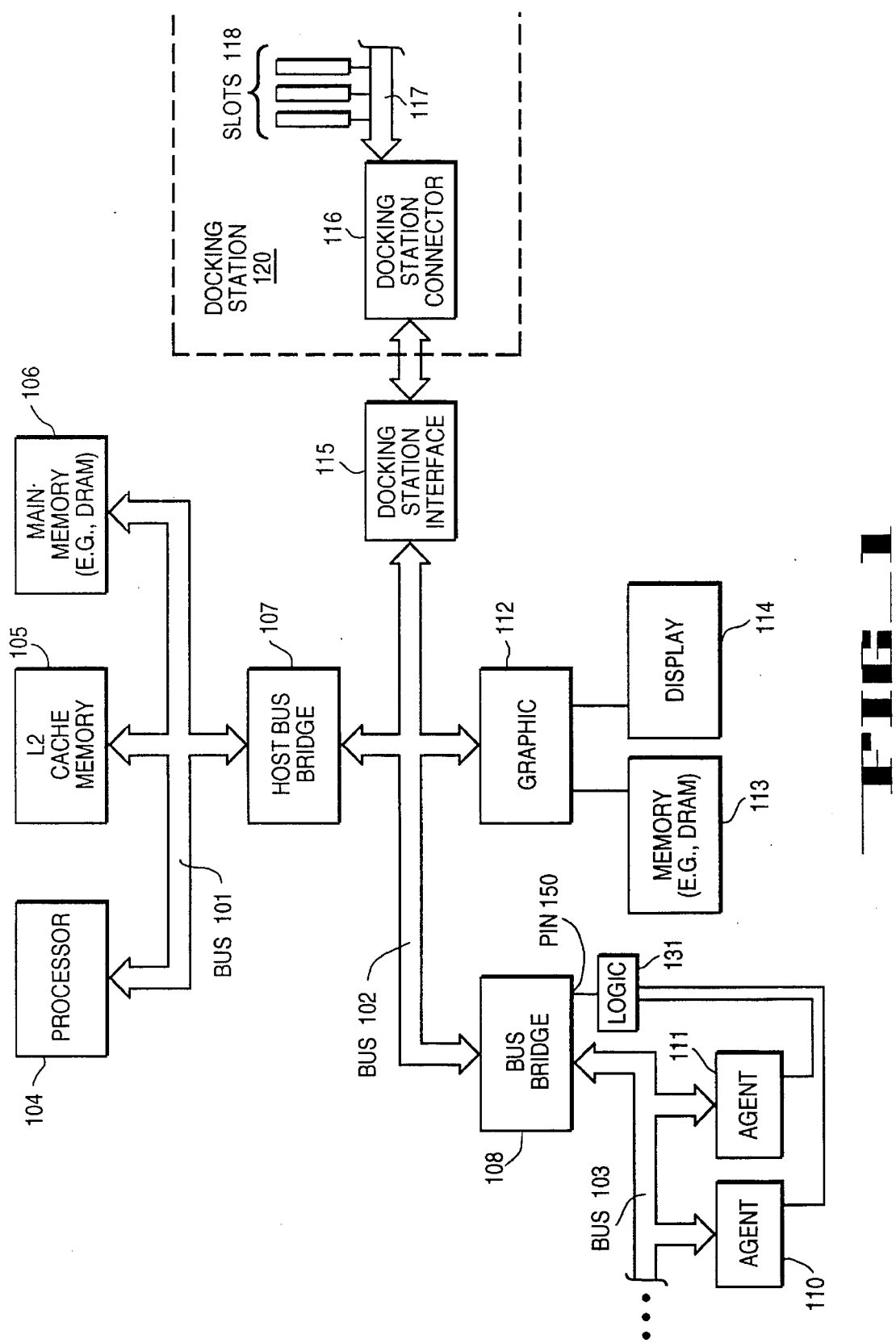
FIG. 1 is a block diagram of one embodiment of the computer system of the present invention.

FIG. 1 is a block diagram of one embodiment of the computer system of the present invention. The computer system comprises a processor 104, a cache memory 105, and a main memory 106. Processor 104, cache memory 105 and main memory 106 are coupled for communication via a host bus 101.

Processor 104 processes information. In one embodiment, processor 104 comprises an Intel Architecture Microprocessor, such as that manufactured by, for instance, Intel Corporation of Santa Clara, California. Processor 104 may comprise a PowerPC™, Alpha™, etc.

Cache memory 105 temporarily stores data and instructions during execution of instructions by processor 104. In one embodiment, cache memory 105 comprises a level two (L2) cache memory.

Main memory 106 comprises a random access memory (RAM) or other dynamic storage device to store information and instructions to be executed by processor 104. In one embodiment, main memory 106 comprises dynamic random access memories (DRAMs).

The present invention also comprises a component bus 102 for communicating information in the computer system. In one embodiment, bus 102 conforms to the peripheral component interconnect (PCI), local bus specification, revision 2.0 published Apr. 30, 1993 by the PCI Special Interest Group.

The computer system further comprises a host bus bridge 107 (e.g., an agent) that enables communication between bus agents coupled to the host bus 101 and bus agents coupled to the component bus 102. Host bus bridge 107 "bridges" bus transactions originating on the host bus 101 and targeted for agents (e.g., devices) on the component bus 102. The host bus bridge 107 also bridges bus transactions originating from the component bus 102 and targeted for processor 104, cache memory 105, or main memory 106. The operation and functionality of host bus bridge 107 of the present invention is well understood to those skilled in the art.

A variety of component systems may be coupled to component bus 102. In one embodiment, wherein the previously described portion of the computer system is housed in a portable "notebook" PC, a docking station interface 115 coupling a docking station 120 to the computer system is coupled to component bus 102. The docking station 120 includes a docking station connector 116 that is coupled to a bus 117 that includes card slots 118. In one embodiment, bus 117 is a PCI bus and slots 118 are PCI slots that allow for connection to the PCI bus and, hence, the component bus 102 via docking station interface 115. In an alternate embodiment, bus 117 comprises an ISA bus, such that the present invention allows two non-PCI buses to co-exist.

One of the slots may enable a communication sub-system to be coupled to the component bus 102. Such a communication sub-system may perform network communication switching hub functions via a set of communication links. The communication system is an intelligent input/output subsystem that includes a microprocessor for controlling the switching hub functions for the communication links.

Also coupled to bus component bus 102 is a graphical subsystem 112 that includes graphics controller, memory (e.g., DRAM) 113 and display 114, such as a CRT or flat panel display, for example. Although not shown, a disk controlled subsystem may be coupled to bus 102. The disk controlled subsystem enables access to a set of disk drives (also not shown) coupled to a set of input/output buses. The disk control subsystem input/output subsystem may include a microprocessor that implements specialized control function for controlling access to the disk devices by the computer system.

Bus 103 provides for communication between various devices coupled to bus 103. In one embodiment, bus 103 comprises an ISA bus, and agents 110 and 111 interface to bus 103 according to the ISA standard. Note that although two agents, 110 and 111, are shown coupled to bus 103, any number of agents may be coupled to bus 103.

The computer system of the present invention may also comprise a read-only memory (ROM) and/or other static storage device coupled to bus 103 for storing static information and instructions for processor 104. An alphanumeric input device, including alphanumeric and other keys, may also be included in the computer system for communicating information and command selections to processor 104. A cursor control device, such as a mouse, a trackball, trackpad, stylus, or cursor direction keys, may be included in the computer system for communicating direction information and command selections for processor 104, and for controlling cursor movement on a display. Another device that may be included is a hard copy device which may be used for printing instructions, data, or other information on a medium such as paper, film, or other similar types of media. Other types of agents coupled to bus 103 may comprise I/O devices, such as keyboards, disks, serial and parallel port controllers, etc.

Also coupled to bus 103 and to the component bus 102 is bus bridge (agent) 108. Bus bridge 108 enables communication between bus agents coupled to component bus 102 (and host bus 101) and bus agent coupled to bus 103, such as agents 110 and 111. Bus bridge 108 includes logic to translate transactions from the PCI protocol to the protocol expected by devices on bus 103.

In one embodiment, agents 110 and 111 are coupled directly to bus bridge 108 by bus 103. In another embodiment, bus agents 110, 111 are also coupled to bus bridge 108 via logic 131. In one embodiment, logic 131 is coupled to one pin of bus bridge 108. Bus bridge 108 contains a set of configuration registers that are programmed by the basic input/output software (BIOS) of the computer system executed by the processor 104. In an exemplary embodiment, the configuration registers in the bus bridge 108 identify bus bridge 108 as a bus bridge to an ISA bus conforming to the ISA local bus standard.

In one embodiment, because component bus 102 operates according to the PCI bus standard, it may contain only one subtractive decode agent. The subtractive decode agent may be the docking station interface 115 which claims bus transactions prior to a finite period of time if no other agent has claimed the transactions, as designated by the PCI standard.

The present invention allows the PCI system to have multiple non-PCI buses. Such a configuration would be particularly useful in a mobile computer that has ISA-like buses on the system board and in a docking station.

Note that any or all of the components of the computer system and associated hardware may be used; however, it can be appreciated that any type of configuration of the system may be used for various purposes as the user requires.

Bus Transactions in the Computer System

Bus transactions occur in the computer system of the present invention. A bus transaction is generated by a master and is sent on a bus (or buses) to a targeted agent, or device. Note that the terms "agent" and "device" are used to interchangability herein. In one embodiment, targeted agents may identify and determine ownership of a bus transaction by decoding an address associated with the transaction. These agents are referred to herein as positive decode agents. Upon performing a decode operation, a positive decode agent may determine ownership by matching the address of the transaction with one or more assigned addresses.

Typical bus transactions may include read operations and write operations. The present invention is applicable to operations requiring acknowledgement from a target (e.g., MEM, I/O and configuration reads and writes).

FIG. 2 is a flow diagram illustrating the process of executing a bus transaction in a computer system according to the teachings of the present invention. A bus transaction begins when a master asserts the start of the bus transaction (processing block 201). In one embodiment, a master asserts the start of a bus transaction by asserting a FRAME# signal. Note that the "#" signifies that the signal is active low. Note that the start of a transaction may be signified as multiple signals being asserted simultaneously. Further, these signals may or may not be active low.

Next, the address associated with the transaction for designating its destination is received by agents in the system (processing block 202). The address may be latched by these agents.

Positive decode agents coupled to the bus (or buses) determine ownership of the bus transaction (processing block 203). In one embodiment, the positive decode agents determine ownership by comparing the address associated with the bus transaction to a set of one or more addresses assigned to the agent. Note that positive decode agents on bus 103 also receive and decode the address associated with transactions being sent on bus 102 (and bus 101).

If a positive decode agent on bus 102 (or bus 101) owns the transaction (processing block 204), then that agent claims the transaction (processing block 205). If a positive decode agent on bus 103 is the owner of the transaction (processing block 206), an agent on bus 103 (e.g., bus bridge 108) claims the transaction on their behalf (processing block 207). This agent claims the transaction prior to a subtractive decode agent on component bus 102 claiming the transaction; however, this agent acts like a subtractive decode agent because it does not perform decoding in order to claim a bus transaction. This agent claims the transaction prior to a finite period of time after which the transaction on the bus would be aborted.

If no positive decode agent on bus 103 is the owner of the transaction, processing continues at processing block 208 where a subtractive decode agent coupled to component bus 102, if any, claims the transaction. According to the PCI protocol, if no agent claims ownership within three PCI clocks, then the subtractive decode agent claims the transaction.

If no subtractive decode agent is coupled to component bus 102, transactions not claimed within a finite period of time are aborted. In such a case, the master aborts the transaction.

In order to determine if a bus transaction has been claimed, in one embodiment, the master checks a DEVSEL# signal on the rising edge of a clock (e.g., the PCI clock) to see if it has been asserted. An agent asserts the DEVSEL# signal when claiming a bus transaction.

Note that although the process described in conjunction with FIG. 2 may imply that the positive decode agents on bus 102 (and bus 101) determine ownership prior to agents coupled to bus 103, in one embodiment, the decoding of the address of the transaction by the agents on the bus 102 and bus 103 is performed as soon as these agents receive the address. Thus, a positive decode agent on bus 103 may determine ownership at the same time or even before positive decode agents on bus 102 (or bus 101). Furthermore, all agents usually perform decoding upon receiving addresses, or in alternate embodiments, are constantly decoding addresses whether or not an address on a bus is a valid address. In such cases, an indication must be provided (such as by one or more signals) to the agents indicating when the address on a bus is a valid bus transaction address. In one embodiment of the present invention, it is the responsibility of bus bridge 108 to know and indicate to such agents on bus 103 when a valid address is on the bus. Bus bridge 108 identifies the presence of a valid address by the FRAME# signal being asserted.

FIG. 3 is a timing diagram depicting selected signals used in performing the bus transaction according to the teachings of the present invention. A clock signal 301 provides the timing of the transaction on component bus 102. In one embodiment, clock signal 301 comprises a PCI clock signal. The FRAME# signal 302 is shown transitioning low (e.g., being asserted) at the middle of the first clock, thereby indicating the start of a bus transaction. The FRAME# signal 302 is asserted based on the rising edge of clock signal 301. As shown, FRAME# signal 302 is asserted based on clock edge 309.

The DEVSEL# signal is asserted based on the rising edge of clock signal 301. Also shown in FIG. 3 are three separate versions of the DEVSEL# signal. The first version of the DEVSEL# signal (303A) is asserted by a positive decode agent on bus 102. The positive decode agents on bus 102 may be of different speeds and may actually assert the DEVSEL# immediately (fast), one clock (medium) or two clocks (slow) after sampling the FRAME# signal 302 being asserted. The DEVSEL# signal is sampled by the master at the rising edge of the clock, such that the master may be made aware that a positive decode agent on bus 102 has claimed the transaction at time T2, T3 or T4. As shown, the DEVSEL# signal 303A is sampled low by the master at T4 indicating that a "slow" positive decode agent has claimed the transaction. The sample times for "fast" and "medium" positive decode agents are also shown.

The second version, DEVSEL# signal 303B, occurs when a subtractive decode agent claims the transaction after all positive decode agents do not claim the transaction, yet prior to the master aborting the bus transaction.

The third version, DEVSEL# signal 303C, is asserted by an agent claiming bus transactions on behalf of other agents (e.g., bus bridge 108) prior to the time of the subtractive decode agent asserts the DEVSEL# signal. That is, the DEVSEL# signal 303C is asserted by a "pseudo-subtractive" decode agent (e.g., bus bridge 108) that claims the transaction on behalf positive decode agents on bus 103.

In one embodiment, this "pseudo-subtractive" decode agent asserts the DEVSEL# signal one clock prior to the time the subtractive decode agent would assert the DEVSEL# signal (if it was claiming the bus transaction). Note that in such an embodiment, the assertion of the DEVSEL# signal by the pseudo-subtractive decode agent may overlap that time allowed for a positive decode agent on bus 102 to claim the transaction. However, in an alternate embodiment, the assertion of the DEVSEL# signal by the pseudo-subtractive decode agent occurs after all positive decode agents on bus 102 have decoded the address and have not claimed ownership of the bus transaction, yet prior to the time at which the subtractive decode agent on bus 102 would claim the transaction.

Thus, in the present invention, certain addresses are positively decoded and the bus bridge 108, acting as an agent, asserts the DEVSEL# signal based on information transferred on bus 102. Agents on bus 103 (e.g., on the extended I/O bus) perform their own decoding of the PCI address and signals the bus bridge 108 based on the results of the decode indicating whether or not the bus bridge 108 is to claim the transaction on their behalf.

Figure 4B:
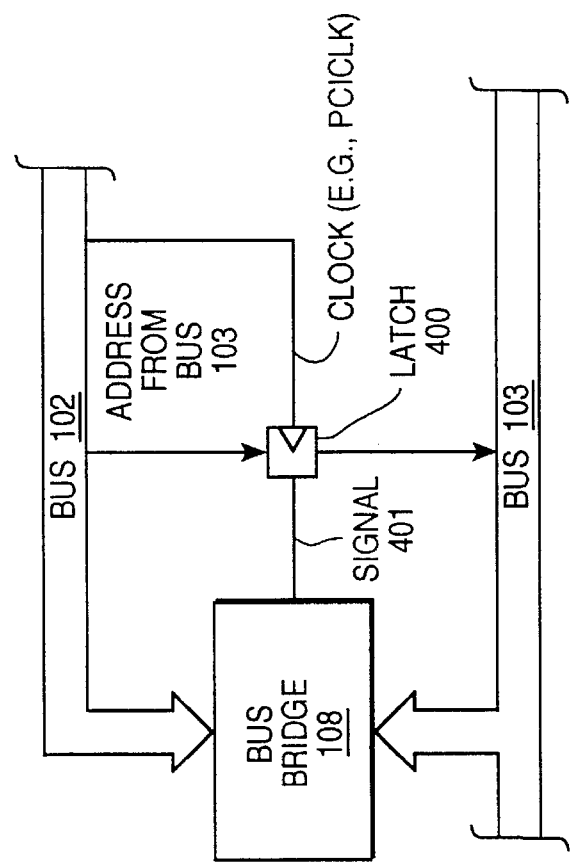
FIG. 4B is an alternate embodiment of address sourcing of the present invention.
Figure 4A:
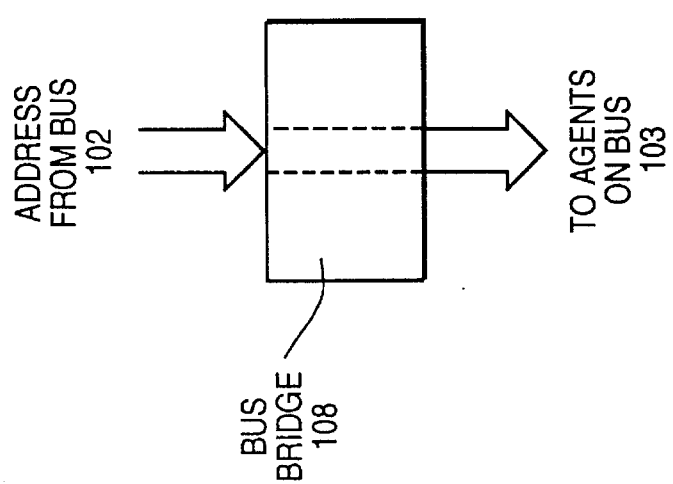
FIG. 4A is one embodiment of address sourcing of the present invention.

In order to allow agents on bus 103 to determine ownership, they must have access to the address of the transaction. This is referred to herein as address sourcing. In one embodiment, the address is passed through bus bridge 108. In such a case the path of the address through bus bridge 108 is optimized to avoid delays. In one embodiment, the path of the address may be optimized by separating the address path from bus 102 (e.g., the PCI bus) to the bus 103 (e.g., I/O bus) from bus 102 to internal logic. Furthermore, the path may be optimized by minimizing routing and parasitics on the bus 102 to bus 103 address path and by using the fastest available buffers and gates. Such an implementation is shown in FIG. 4A.

In another embodiment, the address is externally latched from bus 102. Note that in one embodiment, latching is required due to the PCI bus protocol, which calls for multiplexing addressed and data information on the same lines to the bus, such that the address would be lost if not latched. Note the address may be also latched from the host bus 101. Such an implementation is shown in FIG. 4B. Referring to FIG. 4B, latch 400 latches the address in response to signal 401 from bus bridge 108. In one embodiment, latch 400 comprises a D flip-flop with an active low clock enable that is clocked by a clock signal (e.g., the PCICLK). Agents (e.g., devices) on bus 103 may then access latch 400 in a manner well-known in the art. Bus bridge 108 signals latch 400 in response to the FRAME# signal being asserted. That is, bus bridge 108 indicates the validity of the address in latch 400 based on signals on bus 102.

Once a positive decode agent on bus 103 determines ownership, it signals bus bridge 108 to claim the transaction on its behalf. In one embodiment, the bus bridge 108 is signaled on pin 110 that indicates a decode hit. To allow the pin 150 to be shared by multiple devices (e.g., non-PCI devices), an open drain implementation may be used wherein all the devices use the same input buffer. In an alternate embodiment, a standard driver may be included that includes external logic that ORs the signals together (or ANDs the signals if active low) to produce a signal to the decode hit indication input pin 150.

The bus bridge 108 includes logic to translate the transaction from the protocol of bus 102 to the protocol of bus 103. That is, in one embodiment, bus bridge 103 has logic to translate the transaction from a PCI protocol to the protocol expected by devices using the bus bridge 108 as a surrogate PCI interface. Note that this translation as such is well-known to those skilled in the art.

Thus, bus bridge 108 claims the transaction on behalf of agents on bus 103. Bus bridge 108 claims the transaction at a point in time when it is limited only by the maximum decode delay requirement that depends on the clock frequency, the characteristics of the bus bridge agent itself, and the implementation of the hit pin sharing and address sourcing. The total time allowed for the pseudo-subtractive decode agent to assert the DEVSEL# signal when claiming a transaction is that time in which the FRAME# signal asserted on bus 102 propagates through bus bridge 108, the address of the transaction is decoded by positive decode agents and bus bridge 108 responds prior to the time the subtractive decode agent claims the transaction, which is before the transaction is aborted. To help meet this timing requirement, the delay path in the bus bridge 108 should be optimized. This path, from the HIT# signal (indicating that the bus bridge is to claim the bus transition) to the DEVSEL# signal, should include the minimal number of gates with minimal input and output loading on these gates. For example, other sources of DEVSEL# assertion should be operated upon prior to the operation which includes the DEVSEL# signal from the HIT# signal path. FIGS. 5A and 5B illustrate examples of circuit schematics for generating the DEVSEL# signal. The implementation in FIG. 5A is preferred because it provides a reduced delay from HIT# signal to DEVSEL# signal. Referring to FIG. 5A, a HIT# signal 501 is driven by input driver 502. The output of input driver 502 is coupled to one input of OR gate 503. A disable signal 514 is coupled to the other input. The output of OR gate 503 is coupled to one input of AND gate 504. The other input of AND gate 504 is coupled to the output of AND gate 505. The inputs of AND gate 505 are coupled to other internal sources of the DEVSEL# signal. If any of these other sources are asserted (active low), and the disable signal 514 is deasserted and HIT# signal 501 is asserted, then the output of AND gate 504 is low. The output of AND gate 507 is latched by latch 505 which is clocked by a clock signal (e.g., PCICLK). The output of latch 505 is coupled to the input of output driver 506.

The output of OR gate 503 is also coupled to an inverted input of OR gate 507. The output of OR gate 507 is latched by clocked latch 508 (e.g., by PCICLK). The output of latch 508 controls output driver 506 by enabling output driver 506.

In one embodiment, the HIT# signal 501 is asserted when one of the devices on bus 103 signals bus bridge 108 to claim a bus transaction. In an alternate embodiment, the HIT# signal 501 is asserted in response to a match between all or a portion of an address of the transition and an address associated with one of the devices on bus 103. The disable signal 514 is generated by combinatorial logic and is asserted when the HIT# signal 501 is invalid. This prevents false assertions of the DEVSEL# signal. In one embodiment, disable signal 514 is deasserted in response to a match between a portion of the bus transition address and an address of a device on bus 103. For instance, HIT# signal 501 may be asserted (or de-asserted) in response to a match between one part of the bus transition address and an address associated with one of the devices on bus 103, while disable signal 514 is deasserted based on whether a match exists between a different part of the same addresses.

FIG. 5B comprises an alternate embodiment which differs from the implementation of FIG. 5A by having the other sources of DEVSEL# being input directly to AND gate 504, such that AND gate 505 is no longer necessary. The operation of the circuit is otherwise the same.

In one embodiment, the data bus of bus 102 is 32 bits wide, while the extended I/O bus 103 is capable of handling sixteen or eight bit data bus widths that are byte addressable. If a doubleword in PCI address space includes a byte address owned by a device on bus 102 and another byte owned by a device on bus 103, there will be a conflict. To protect against loss of data, in one embodiment, the address bus portion of bus 103 is restricted to be a doubleword address space.

In an alternate embodiment of the present invention, the decoding of address associated with transaction may be performed by external logic and not by a chip or device on the extended I/O bus 103. This may be especially useful if the address path is too slow to allow the proper timing, such as described in FIG. 3. In such a case, a device on component bus 102 performs the decoding and signals the bus bridge 108 if the address on the transaction matches one of the addresses of agents on bus 103. In response to being signaled from such a device on component bus 102, bus bridge 108 claims the transaction, translates protocols from that used on bus 102 to that used on bus 103 (e.g., from PCI bus protocol to the ISA, or extended bus protocol) where the device is waiting for the transaction.

Whereas, many alterations and modifications of the present invention will no doubt become apparent to a person of ordinary skill in the art after having read the foregoing description, it is to be understood that the particular embodiment(s) shown and described by way of illustration is in no way intended to be considered limiting. Therefore, references to details of various embodiment are not intended to limit the scope of the claims which in themselves recite only those features regarded as essential to the invention.

Thus, a subtractive decode apparatus and method for using the same have been described.

We claim:

1. A computer system comprising:

a bus;

a first agent coupled to the bus that issues a transaction on the bus, wherein the transaction is aborted if not claimed within a finite period of time;

a second agent coupled to the bus that claims the transaction prior to expiration of the finite period of time without performing decoding to determine ownership of the transaction if the transaction has not been previously claimed; and a third agent coupled to the bus that claims the transaction prior to the second agent claiming the transaction without performing decoding on the transaction to determine ownership.

2. The computer system defined in claim 1 wherein the bus comprises a PCI bus.

3. The computer system defined in claim 1 wherein the third agent comprises a bus bridge.

4. The computer system defined in claim 1 wherein one or more agents are coupled to the third agent and the third agent claims the transaction when one of said one or more agents determines its ownership of the transaction.

5. The computer system defined in claim 4 wherein said one or more agents perform decoding to determine ownership.

6. The computer system defined in claim 4 wherein one of said one or more agents signals the third agent to claim the transaction upon determining ownership of the transaction.

7. The computer system defined in claim 6 wherein the third agent includes an input pin to receive indications from said one or more agents signaling the third agent to claim the transaction.

8. The computer system defined in claim 7 wherein external logic coupled to said third agent and said one or more agents receives indications of decode hits from said one or more agents and signals the third agent to claim the transaction.

9. The computer system defined in claim 4 wherein said one or more agents perform decoding on an address associated with the transaction received from the bus via the third agent.

10. The computer system defined in claim 4 wherein said one or more agents perform decoding on an address associated with the transaction received from the bus via external logic coupled between the bus and said one or more agents.

11. A computer system comprising a first bus;

a least one agent of a first type of agent that determines ownership of bus transactions transferred on the first bus by decoding addresses associated with said bus transactions;

a first agent of a second type coupled to the first bus that claims ownership of said bus transactions transferred on the first bus prior to a finite period of time elapsing and if agents coupled to the first bus do not claim ownership of said bus transactions; and a second agent coupled to the bus that claims a bus transaction being transferred on the first bus prior to the first agent and on behalf of a third agent not coupled to first bus if one of the third agents determines ownership of said bus transaction.

12. The computer system defined in claim 11 wherein the bus comprises a PCI bus.

13. The computer system defined in claim 11 wherein the second agent comprises a bus bridge.

14. The computer system defined in claim 11 wherein the third agent determines ownership by decoding an address associated with the bus transaction.

15. The computer system defined in claim 11 wherein the second agent claims the bus transactions in response to at least one signal from the third agent.

16. The computer system defined in claim 11 wherein the second agent includes at least one pin to receive an indication from said third agent in response to which the second agent claims the bus transaction.

17. The computer system defined in claim 11 wherein said third agent determines bus ownership by decoding an address associated with the bus transaction received from the first bus via the second agent.

18. A method of performing a bus transaction being transferred on a first bus for one or more agents on a second bus, said method comprising:

said one or more agents decoding an address associated with the bus transaction;

one of said one or more agents signaling a device coupled to the first bus to claim the bus transaction; and the device claiming the bus transaction on behalf of said one of said one or more agents prior to a subtractive decode agent on the first bus.

19. The method defined in claim 18 wherein the transaction is claimed after positive decode agents on the first bus perform decoding on the address and do not claim the transaction.

* * * * *